United States Patent
Spazier

(10) Patent No.: US 11,383,638 B2
(45) Date of Patent: Jul. 12, 2022

(54) ILLUMINATION DEVICE FOR AN INTERIOR SPACE OF A VEHICLE

(71) Applicant: DAIMLER AG, Stuttgart (DE)

(72) Inventor: Norbert Spazier, Bondorf (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 0 days.

(21) Appl. No.: 17/286,079

(22) PCT Filed: Oct. 9, 2019

(86) PCT No.: PCT/EP2019/077426
§ 371 (c)(1),
(2) Date: Apr. 16, 2021

(87) PCT Pub. No.: WO2020/078812
PCT Pub. Date: Apr. 23, 2020

(65) Prior Publication Data
US 2021/0354622 A1 Nov. 18, 2021

(30) Foreign Application Priority Data

Oct. 17, 2018 (DE) .................. 10 2018 008 228.9

(51) Int. Cl.
*B60Q 3/208* (2017.01)
*B60Q 3/66* (2017.01)
*F21V 8/00* (2006.01)
*F21Y 115/10* (2016.01)

(52) U.S. Cl.
CPC .............. *B60Q 3/208* (2017.02); *B60Q 3/66* (2017.02); *G02B 6/0055* (2013.01); *F21V 2200/10* (2015.01); *F21Y 2115/10* (2016.08)

(58) Field of Classification Search
CPC . B60Q 3/208; B60Q 3/66; B60Q 3/62; B60Q 6/43; G02B 6/0055
USPC .................................. 362/488–492, 511, 523
See application file for complete search history.

(56) References Cited

U.S. PATENT DOCUMENTS

| 4,310,871 | A | 1/1982 | Adachi |
| 6,727,962 | B2 | 4/2004 | Adams |
| 7,204,625 | B2 | 4/2007 | Wiemers |
| 7,357,548 | B2 * | 4/2008 | Haenen ................ G02B 6/4298 362/558 |

(Continued)

FOREIGN PATENT DOCUMENTS

| CN | 112325187 A * | 2/2021 |
| DE | 2944537 A1 | 5/1980 |

(Continued)

OTHER PUBLICATIONS

International Search Report dated Jan. 31, 2020 in related/corresponding International Application No. PCT/EP2019/077426.

(Continued)

*Primary Examiner* — Lau K Tso
(74) *Attorney, Agent, or Firm* — Patent Portfolio Builders PLLC

(57) ABSTRACT

An illumination device for an interior space of a vehicle includes at least one light source and at least one light surface. The light surface is formed by at least one at least partially mirrored optical fiber, and the optical fiber can be adjusted to a shape of a windscreen.

9 Claims, 2 Drawing Sheets

(56) References Cited

U.S. PATENT DOCUMENTS

Figure 1:
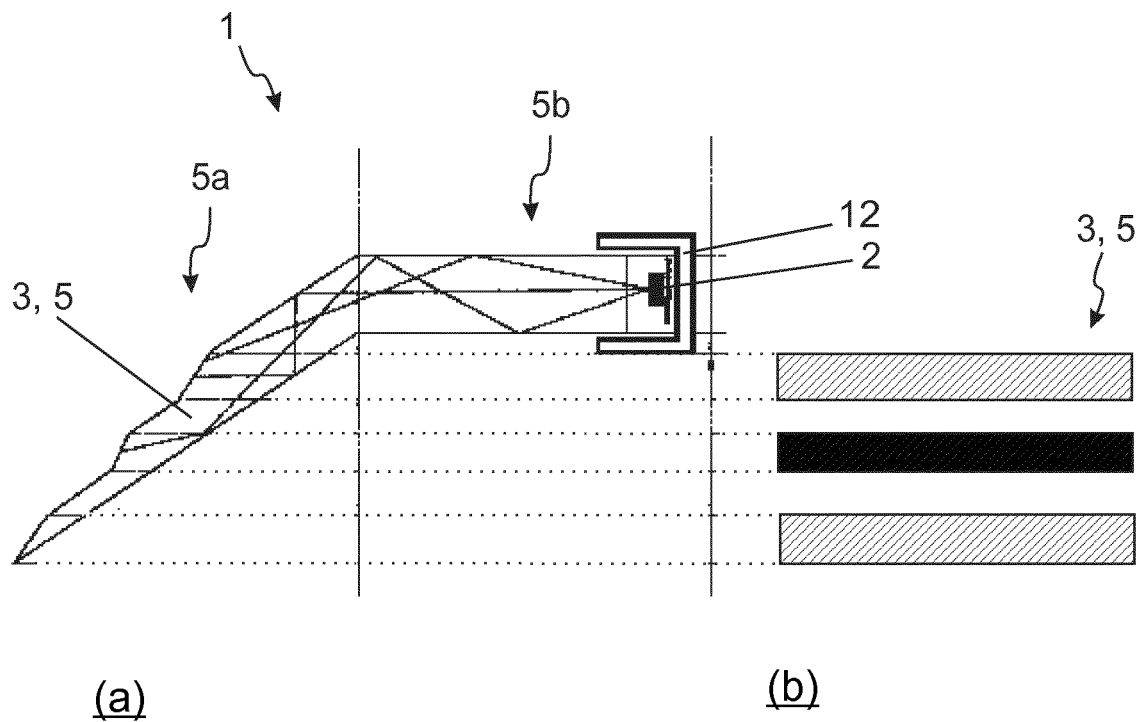

| | | | | |
|---|---|---|---|---|
| 2002/0071267 A1* | 6/2002 | Lekson | ............... | B60Q 1/302 |
| | | | | 362/23.17 |
| 2004/0208013 A1* | 10/2004 | Dalton, Jr. | ............ | B60Q 3/252 |
| | | | | 362/488 |
| 2014/0003076 A1* | 1/2014 | Suganumata | ......... | F21S 43/245 |
| | | | | 362/511 |
| 2016/0347243 A1 | 12/2016 | Jeong | | |
| 2017/0282684 A1 | 10/2017 | Fearns et al. | | |

FOREIGN PATENT DOCUMENTS

| | | |
|---|---|---|
| DE | 10026892 A1 | 12/2001 |
| DE | 10232797 A1 | 1/2004 |
| DE | 102004012922 A1 | 10/2005 |
| DE | 102005027262 A1 | 12/2006 |
| DE | 102010013819 A1 | 10/2011 |
| DE | 102013016817 A1 | 4/2015 |
| DE | 102016203164 A1 | 12/2016 |
| DE | 102016213629 A1 | 2/2018 |
| DE | 102016215593 A1 | 2/2018 |
| DE | 102017120244 A1 * | 3/2019 ........... B60Q 1/2607 |
| DE | 102018103659 A1 * | 8/2019 ............... B60Q 3/51 |
| FR | 3042753 A1 | 4/2017 |
| JP | 2008146327 A | 6/2008 |
| WO | 2012090111 A1 | 7/2012 |

OTHER PUBLICATIONS

Office Action created Jun. 14, 2019 in related/corresponding DE Application No. 10 2018 008 226.9.

Written Opinion dated Jan. 31, 2020 in related/corresponding International Application No. PCT/EP2019/077426.

Office Action dated Jun. 22, 2021 in related/corresponding DE Application No. 10 2018 008 228.9.

* cited by examiner (a) (b)

ILLUMINATION DEVICE FOR AN INTERIOR SPACE OF A VEHICLE

BACKGROUND AND SUMMARY OF THE INVENTION

Exemplary embodiments of the invention relate to an illumination device for an interior space of a vehicle.

Illumination devices for an interior space of a vehicle having at least one light source, such as one or more LEDs or OLEDs, for example, are known from the prior art. Here, the vehicle interior illumination is generally ensured using light sources that are positioned in the roof region of the vehicle.

DE 100 26 892 A1, much like DE 29 44 537 A1, describes a construction that corresponds constructively substantially to an illumination device having a light source and a light surface.

Furthermore, DE 10 2016 215 593 A1, for example, describes a system for illuminating an interior space of a vehicle, in which at least one seat position is defined. The system comprises a brightness detection unit, with which a surroundings brightness can be detected, and an illumination unit, which extends across a region above the seat position and with which a diffuse light emission can be generated. The diffuse light emission has an illumination parameter which can be set depending on control signals of a control unit.

It is known that light in the wavelength range of 460 nm has an impact on the strength of the secretion of melatonin in the human blood circulatory system. The circadian rhythm, for example, is regulated by this secretion. Here, light suppresses or regulates the production of melatonin, wherein, in the event of too little light, the pineal gland is stimulated to produce melatonin.

In general, as a result of the usual position of the illumination device and the radiation direction of the light connected to this, there is the danger of a large part of the light not reaching the ganglion cell in the eye. In particular with passenger vehicles, because of the limited construction spaces in the region of the driver or passenger seat and because of the topology of the passenger vehicle, conventional lights barely come into question in order to implement a daylight supplement using melanopically effective light in passenger vehicles. This is caused by the necessary spacing apart from a possible mounted light and the eyes of the driver and thus the necessary angle of incidence of the light beams resulting from this into the eye generally not being able to be achieved in passenger vehicles. Furthermore, housing a light in front of the eyes of the driver, for example in the front region of the roof liner, often proves to be difficult, wherein the angle of incidence of the light beams in such a position of the light is also not optimal for optimally reaching the ganglion cells in the eye of a driver or passenger. Current sun shields and a zone of the possible head collision of the driver make a suitable positioning of the light difficult.

In building technology and when fitting clinics, there are technological solutions, for example, with which a higher light yield can be obtained in a required region.

An arrangement for illuminating a space intended for accommodating people is shown in DE 10 2005 027 262 A1. Here, two light sources are used that generate light components with different color temperatures, wherein the radiation surface for the second light component is at least twice as large as the radiation surface for the first light component and is formed to irradiate diffusely. The second light component is irradiated in such a way that it illuminates a vertical wall region that is located at least above the eyeline of a person. Here, a secondary reflector can be a radiated with the second light component.

Exemplary embodiments of the present invention are directed to an illumination device for an interior space of a vehicle, in particular a passenger vehicle, with which a daylight supplement can be formed and the efficiency of the irradiated light can be increased.

At least one light surface, which is formed by at least one at least partially mirrored optical fiber, forms the core of the illumination device according to the invention, wherein the optical fiber can be adjusted to the shape of a windscreen. Here, the light source irradiates melanopically effective light, having a sufficient intensity in the wavelength range of 460 nm in order to implement a daylight supplement. The invention makes possible a particularly favorable positioning of the light surface, via which the melanopically effective light of the light source is irradiated, in the region of the upper edge or along an upper edge of a windscreen, yet according to an embodiment with a spacing apart from the upper end of the windscreen, such that, on the one hand, components provided there, such as the edge of a roof panel, sun shields and similar, do not cover the light surface and, on the other hand, a light incidence is carried out from the same direction, in which daylight also enters into the interior space of the vehicle from outside the vehicle. By means of the position of the light surface, an optimal angle of incidence for the light from the light source into the eye of the driver or passenger can be achieved, such that the ganglion cells in the eye are irradiated particularly effectively.

For example, the optical fiber is arranged in the upper region of the windscreen and below the transverse member to which the windscreen is fixed, in particular adhered.

In particular when the optical fiber is formed transparently or semi-transparently, a transmission loss in the region of the windscreen can be extensively avoided, such that the transparency is not limited by the windscreen.

The light surface of the optical fiber from which the light emerges is preferably aligned nasally. Accordingly, the irradiation of the eyes of the driver and/or the passenger is carried out frontally. A lateral, i.e., temporal, irradiation can be at least extensively dispensed with according to an embodiment of the invention, such that the width of the light surface can be limited in a horizontal plane. For example, the light surface has a width of 15 cm maximum.

The optical fiber can be adjusted to the contour of the windscreen and can be formed, for example, rectangularly, quadratically, polygonally, trapezoidally or even in a free shape. Preferably, the optical fiber is at least partially arranged on the inside of the windscreen and fixed there. The optical fiber can be formed to be partially or completely mirrored. Preferably, surfaces predetermined by calculation on the optical fiber are provided that are able to distribute light beams omitted from the light source in such a way and to align to the eyes in such a way that the ganglion cells in the eyes are optimally irradiated.

Preferably, the optical fiber is flexible, initially or permanently, across a portion, so that its shape can be variably adjusted to the shape of the windscreen, wherein an adaptation to the alignment of the windscreen, for example in relation to a vehicle roof region or vehicle roof liner, also falls under an adaptation to the shape of the windscreen.

The light source can preferably be facing away from eye area of the occupants of the vehicle in such a way that a glare affect does not arise and only the rays specifically deflected by the optical fiber reach the eye or eyes. In other words, the irradiation direction of the light source can be directed away from the occupants of the vehicle, at least from the eyes of the occupants of the vehicle, for example forwards in the driving direction of the vehicle.

Coupling the light out of the optical fiber and/or deflecting the light in the optical fiber can preferably be carried out via at least one defined surface which can be mirrored, transparent or semi-transparent. For example, the defined surface is coated, in particular vaporized, in order to achieve the mirroring.

The efficiency of HCL lights (Human Centric Lighting) in vehicles, in particular in passenger vehicles, can be improved by means of the invention. Using the invention, it can be achieved that sufficient light in the wavelength of 460 nm reaches the ganglion cells on the retina.

According to an advantageous embodiment of the invention, the light source comprises at least one LED. In particular, the light source is formed by several LEDs, which are arranged one next to the other, preferably horizontally. Thus, the light source can have a shape which is optimized for the preferred shape of the optical fiber as a comparatively narrow strip along the upper edge of the windscreen.

According to an embodiment of the invention, the light source is arranged on a front face of the optical fiber. Preferably, coupling the light from the light source into the optical fiber is carried out via a narrowly formed region, such that a low constructive height of the illumination device can be achieved.

According to a further advantageous design, it can be provided that the light source can be arranged or is arranged behind a roof panel of the interior space of the vehicle, such that the light source cannot be seen directly from a position out of the interior space of the vehicle. Here, the light source is preferably substantially aligned in the direction of the windscreen on which the optical fiber is arranged. If the light source is arranged behind the roof panel, then coupling the light into the optical fiber preferably also takes place in a region behind the roof panel. In such a design, the optical fiber can consequently run along the windscreen and behind the roof panel.

A very favorable development of the illumination device according to the invention provides that the optical fiber has a first portion and a second portion, wherein the first portion can be adjusted to a contour of the windscreen, and the second portion can be arranged behind the roof panel. Here, the first portion and the second portion can be arranged at an angle to each other. The optical fiber is correspondingly adjusted to the pane contour in a region, and lies above or behind the roof panel in a further region, wherein the optical fiber can be easily integrated there as a result of its compact construction or small construction height.

The optical fiber can have an extension (height) of from 10 cm to 20 cm, for example in a direction perpendicular to the width direction in said first portion, or in general in the first and second portion.

Using the invention, an optimal daylight supplement can be achieved even in a passenger vehicle despite limited space ratios for integrating the illumination device.

A vehicle according to the invention, in particular a motor vehicle, for example in the form of a passenger vehicle, has an illumination device in the transition region between the windscreen and the roof panel, wherein the optical fiber extends from the region behind the roof panel up to a region on the upper edge of the windscreen, such that the light surface is positioned on the windscreen.

Further advantages of the illumination device according to the invention emerge from the description below of exemplary embodiments and the figures.

BRIEF DESCRIPTION OF THE DRAWING FIGURES

Figure 2:
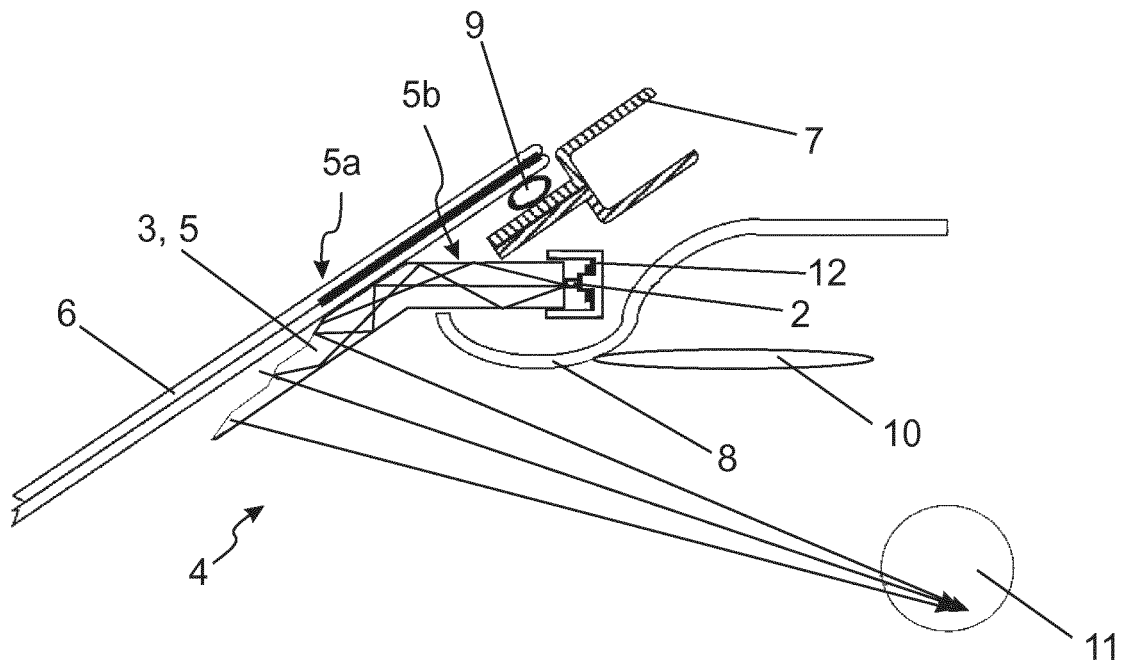
Figure 3:
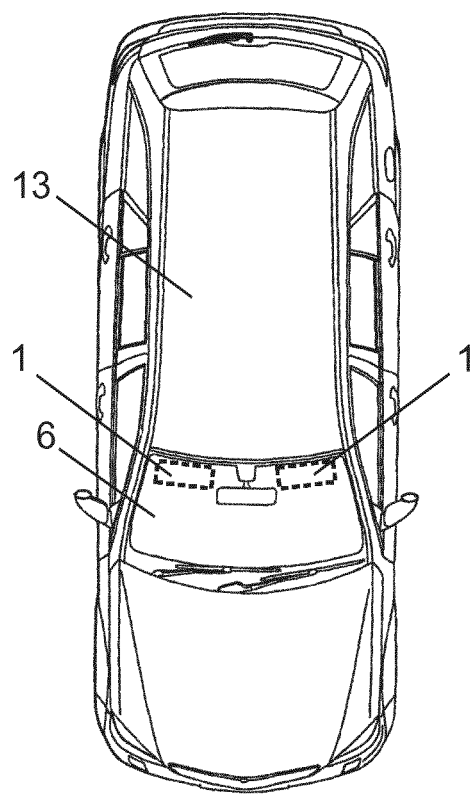

Here are shown:

FIG. 1 a possible embodiment of an illumination device according to the invention;

FIG. 2 a possible arrangement of the illumination device from FIG. 1 inside a vehicle;

FIG. 3 a possible arrangement of the illumination device in a vehicle.

DETAILED DESCRIPTION

In FIG. 1a, a sectional depiction of a possible embodiment of an illumination device 1 is reproduced. A light source 2 is arranged in an edge region of an optical fiber 5 or on the end face in relation to this, wherein the optical fiber 5 forms a light surface 3, via which the light coupled into the optical fiber 5 from the light source 2 is irradiated. The light source 2 is here received and fixed in a frame 12. The frame 12 can also fix the optical fiber 5.

In the embodiment shown, the optical fiber 5 is divided into a first portion 5a and a second portion 5b, wherein at least the first portion 5a is flexible and can be adjusted to a contour of a windscreen (not pictured). The first portion 5a can be designed flexibly overall or can have a flexible surface facing towards the windscreen, depicted here by the surface line with sections arranged at an angle to one another. The second portion 5b, into which the light of the light source 2 is coupled, is arranged horizontally, for example.

In the embodiment depicted in FIG. 1, the light surface 3 is provided in particular only in the first portion 5a, whereas the second portion 5b serves only to couple in the light from the light source 2 and to forward the light to the first portion 5a and does not have a light surface 3.

FIG. 1b shows a top view rotated by 90° in comparison to FIG. 1a of the light surface 3 in the region of the first portion 5a. The optical fiber 5 is formed partially transparently and partially semi-transparently (depicted by the dashed surfaces). These transparent or semi-transparent surfaces of the optical fiber 5, which here alternate in the vertical direction, can be specifically calculated and designed for every application.

A possible arrangement of the illumination device 1 from FIG. 1 inside a vehicle is depicted in FIG. 2. The same components are here provided with the same reference numerals, such that these do not have to be discussed further in detail. The second portion 5b of the optical fiber 5 extends substantially behind a roof panel 8, wherein the light source 2 with the frame 12 is also positioned behind the roof panel 8. In particular, these are those regions of the roof panel 8 in which a sunshield 10 is arranged on the outside.

With the first portion 5a, the optical fiber 5 is in contact with the windscreen 6. At least in this region, the optical fiber 5 can be adjusted to the shape of the windscreen 6, for example by adjusting the angle between the first portion 5a and the second portion 5b and/or by adjusting the surface, facing towards the windscreen 6, of the first portion 5a.

The windscreen 6 is connected to a transverse member 7 of the motor vehicle via a pane bonding 9 on its upper end or along the upper edge, along which the optical fiber 5 is also positioned. The light source 2 is arranged between the transverse member 7 and the roof panel 8. The light of the light source 2 is led out of this region behind the roof panel 8 to the light surface 3 via the optical fiber 5 and is irradiated from there in the direction of an eye height of an occupant of the vehicle (not pictured), such that the light reaches the ganglion cells on the retina of the occupant. The region in which the eyes of the occupant are located is labelled with 11 in FIG. 2.

In particular, light of the wavelength range 460 nm is irradiated. The light incidence of the light from the light source 2 into the interior space 4 is here carried out from the same direction from which daylight from outside the vehicle enters into the interior space 4. A sufficient luminous power for suppressing the melatonin release is achieved by the additional light irradiation of the light of the light source 2 via the light surface 3. As a result of the high transparency of the optical fiber 5, which is achieved, in particular, by forming as a partially mirrored optical fiber 5, this is carried out with only low transmission losses in the region of the windscreen.

The optical fiber 5 is coated, in particular, on its side facing away from the vehicle occupant or from the vehicle interior space 4, in particular vaporized, in order to achieve the desired mirroring or partial mirroring and thus to generate the individual reflective surfaces spaced apart from one another and advantageously provided according to an embodiment of the invention, via which the light coupled into the optical fiber 5 is irradiated in the direction of the occupant or in the direction of the eyes of the occupant. The optical fiber 5 can be designed completely or substantially completely transparently at least in the region of its superposition with the windscreen 6 between these individual reflective surfaces.

A possible arrangement of the illumination device 1 in a vehicle 13 is depicted in FIG. 3. In the plan view of the vehicle 13, it can be seen that, in each case, one illumination device 1 is arranged on the driver side and on the passenger side. The dashed region here shows the region of the light surface 3 or the rear side of the first portion 5a, positioned behind the windscreen 6, of the optical fiber 5 from FIGS. 1 and 2. In the plan view, the surfaces superimposed by this region have a greater width than height and form, for example, a rectangle. Here, the optical fiber 5 can have, for example, a segmentation between transparent and semi-transparent surfaces corresponding to the depiction of FIG. 1b.

In principle, the light surface 3 can have a shape deviating from the formation shown here. The arrangement of the transparent or semi-transparent surfaces can also be designed differently to as is shown in FIG. 1b, for example with semi-transparent surfaces arranged one next to the other in the manner of a column, in the form of diagonal strips made of semi-transparent surfaces or in the form of a checked pattern made of semi-transparent surfaces, which alternate correspondingly with transparent surfaces. Instead of semi-transparent surfaces, opaque surfaces could also be provided which alternate with transparent or semi-transparent surfaces.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An illumination device for an interior space of a vehicle, the illumination device comprising:
   at least one light source, wherein the light source is a melanopically effective light source, in order to implement a daylight supplement; and
   at least one light surface formed by at least one at least partially mirrored optical fiber, wherein the at least one at least partially mirrored optical fiber is adjustable to a shape of a windscreen, and wherein the at least one light source is optically coupled to the at least one light surface.

2. The illumination device of claim 1, wherein the at least one at least partially mirrored optical fiber has at least one region that is transparent or semi-transparent.

3. The illumination device of claim 1, wherein the at least one light source has at least one light emitting diode.

4. The illumination device of claim 1, wherein the at least one light source is arranged on an end face of the optical fiber.

5. The illumination device of claim 1, wherein the at least one light source is arrangeable behind a roof panel of the interior space of the vehicle.

6. The illumination device of claim 1, wherein the at least one at least partially mirrored optical fiber has a first portion and a second portion, wherein the first and second portions are arranged at an angle to each other, wherein the first portion is adjustable to a contour of a windscreen, and the second portion is configured to be arranged behind a roof panel.

7. The illumination device of claim 1, wherein the at least one at least partially mirrored optical fiber has a width of from 10 cm to 20 cm.

8. The illumination device of claim 1, wherein the at least one at least partially mirrored optical fiber is flat and extends in at least two spatial directions and is adjustable to a two-dimensional region of a windscreen.

9. A vehicle, comprising:
   a windscreen;
   an interior space delimited by the windscreen;
   a roof panel attached to the windscreen; and
   an illumination device, comprising
      at least one light source, wherein the light source is a melanopically effective light source, in order to implement a daylight supplement; and
      at least one light surface formed by at least one at least partially mirrored optical fiber, wherein the at least one at least partially mirrored optical fiber is adjustable to a shape of a windscreen, and wherein the at least one light source is optically coupled to the at least one light surface,
   wherein the illumination device is arranged in a transition region between the windscreen and the roof panel,
   wherein the at least one at least partially mirrored optical fiber extends from a region behind the roof panel onto a region on an upper edge of the windscreen, such that the at least one light surface is positioned on the windscreen.

* * * * *